No. 885,601.
PATENTED APR. 21, 1908.
J. P. GAULT.
ENGINEER'S BRAKE VALVE.
APPLICATION FILED SEPT. 9, 1907.
2 SHEETS—SHEET 1.
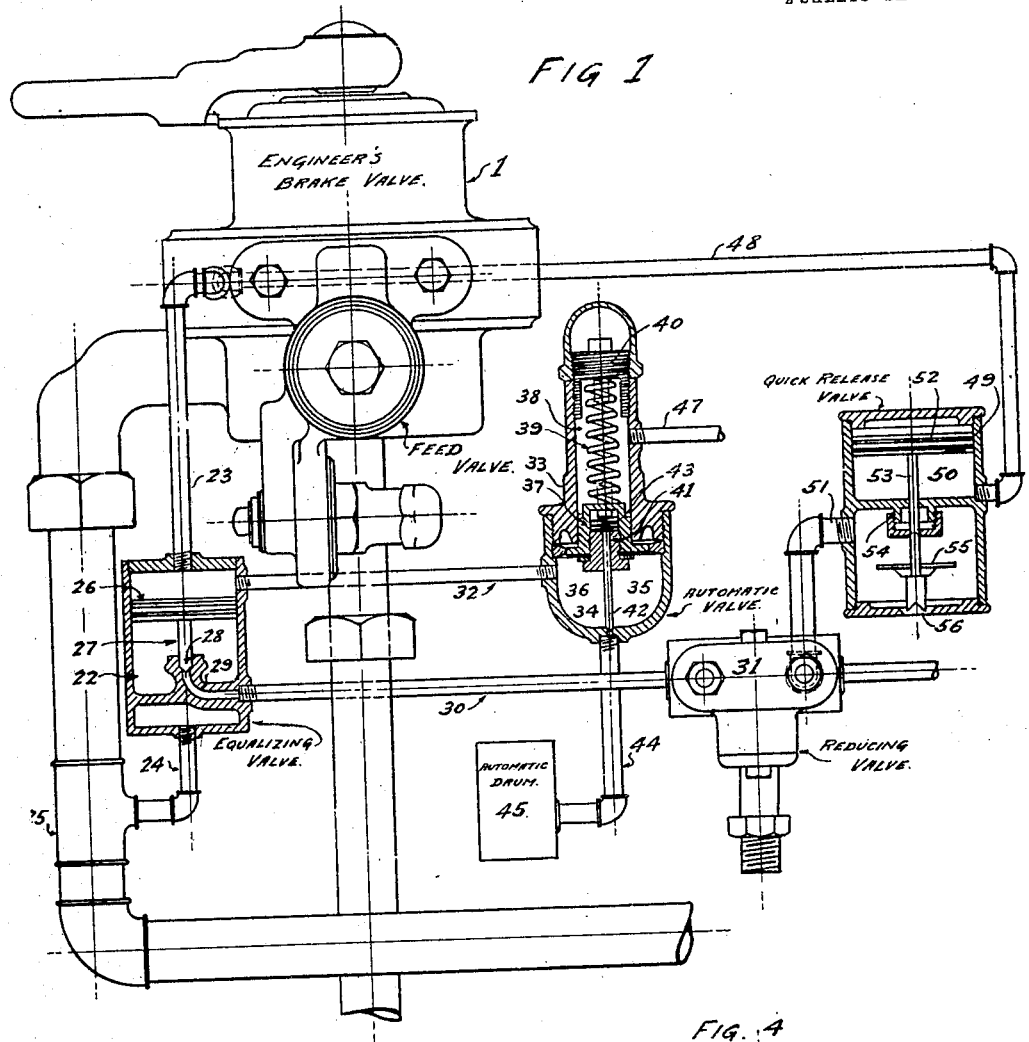
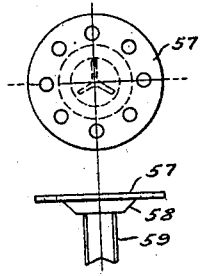

No. 885,601.
PATENTED APR. 21, 1908.
J. P. GAULT.
ENGINEER'S BRAKE VALVE.
APPLICATION FILED SEPT. 9, 1907.
2 SHEETS—SHEET 2.
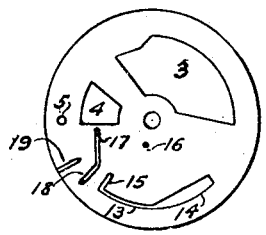
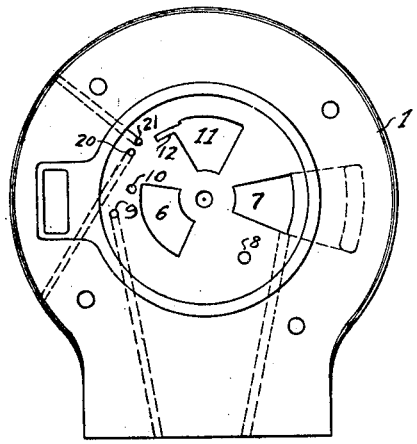
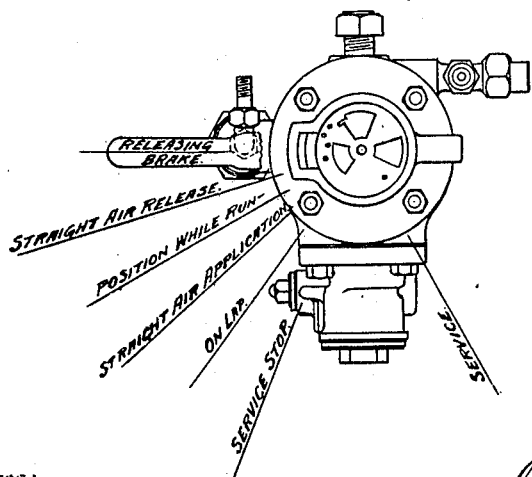
Witnesses:
Inventor

UNITED STATES PATENT OFFICE.

JOSEPH P. GAULT, OF LOUISVILLE, KENTUCKY, ASSIGNOR OF ONE-THIRD TO WILLIAM PHILLIPS, OF LOUISVILLE, KENTUCKY.

ENGINEER'S BRAKE-VALVE.

No. 885,601.   Specification of Letters Patent.   Patented April 21, 1908.

Application filed September 9, 1907. Serial No. 391,984.

*To all whom it may concern:*

Be it known that I, JOSEPH P. GAULT, a citizen of the United States, residing at Louisville, in the county of Jefferson and State of Kentucky, have invented certain new and useful Improvements in Engineer's Brake-Valves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to fluid pressure airbrakes and more particularly to engineer's brake valves and parts used in connection therewith in the brake system.

It has for its object to improve the construction of the engineer's brake valve so as to be capable of a wider range of application than heretofore and in a simple and efficient manner, and to combine the same with certain parts so as to obtain a mode of operation that will give the engineer better control over the engine as well as over the train brakes, and under more conditions than previously.

To the accomplishment of the objects which will be hereinafter more in detail specified, the invention consists in features of construction and in arrangement and combination of parts which will be fully set forth and then sought to be clearly defined by the claims, reference being had to the accompanying drawing forming a part hereof, and in which Figure 1 is a side elevation partly in section, showing the relation of various parts; Fig. 2 a bottom plan view of the rotary valve of the brake valve with my improvements thereon added; Fig. 3 is a plan view of the valve seat of an engineer's brake valve showing the arrangement of various parts with changes over the ordinary valve; Fig. 4 is a plan and side view of the valve in the bottom chamber of the quick-release valve; and Fig. 5 is a cross section through the brake valve above the valve seat.

The numeral 1 designates an engineer's brake valve constructed generally in accordance with the well known Westinghouse engineer's brake valve such for instance as illustrated in U. S. Patent No. 557,463 dated March 31, 1896 or other constructions of the same type to which my improvements are applicable and which accordingly needs no detail showing and description of all the Westinghouse features of such type of valve although some of the features may be shown to illustrate my improvements in relation thereto. Accordingly in Fig. 2 of the drawing, there is shown the cavity 3, the through supply port 4 and the through port 5 which are substantially the same as corresponding parts in the Westinghouse valve, and also the port 16 which corresponds to the warning port of the Westinghouse brake-valve but in a slightly changed position and which, when brake handle is in "full release position," acts to warn or caution the engineer against over-charging the train line, while in Fig. 3, which is a plan view of the valve seat, there is illustrated the cavity 6, the direct application and supply port 7, the equalizing port 8, the feed-port 9, the preliminary port 10 and the direct application and exhaust port 11 having the exhaust groove 12, which parts are substantially the same as in the Westinghouse type of valve referred to, except that the exhaust groove 12 is somewhat shortened.

Referring now to the present improvements, I form the exhaust cavity 13 of the valve proper with a widened extension 14 at one end and at the other end with a lateral cavity 15. I also provide a feed cavity 17 from which leads a feed cavity 18, and I further provide a feed cavity 19. Through these cavities main drum pressure is fed to the equalizing valve hereinafter mentioned in different positions of the valve. The cavity 19 is mainly for feeding main drum pressure on top of the equalizing valve piston through port 20 when the brake valve handle is in straight air release position. It however also feeds train line when the brake valve handle is in straight air application position.

In the valve seat I form a through port 20 and also a through port 21. With the exceptions stated the brake valve is constructed as usual so that its several parts will operate as ordinarily for the automatic application and release of the brakes so far as concerns the parts of the brake valve, my improvements being intended to provide also for the use of straight air in the application and release of the engine and tender brakes as supplemental to the automatic application and release of the brakes.

Having changed the brake-valve as specified, I provide an equalizing valve 22 connected at one end by a pipe 23 with the port 20 in brake valve seat and connected at its other end by a pipe 24 with the nozzle or pipe 25 which leads to the main reservoir or drum (not shown). The equalizing valve has a piston 26 carrying a valve 27, the seat 28 for which is between the piston and the pipe leading to the main reservoir or drum, and is formed in a passage-way 29 from which runs the brake cylinder pipe 30 which is shown as having in its length a reducing-valve 31 which may be the old style of Westinghouse feed valve, the brake cylinder pipe extending to the brake cylinder of the engine and its tender.

From the upper portion of the equalizing valve, above its piston, a pipe 32 leads to an automatic valve 33 of suitable construction. This valve consists preferably of a chamber 34 having diaphragm 35 bearing against a movable disk 36 having a hub 37 fitting movably in a casting 38 containing a spring 39 bearing at one end against the hub 37 and the tension of which may be regulated by a threaded nut 40 in the upper part of the casing so as to set the automatic valve to operate at any desired pressure. In the hub 37 fits a nut 41 through which passes a valve stem 42 between the head of which and the nut 41 may be a yielding spring 43. These details however are not essential and may be changed. The lower end of the valve stem 42 serves as a valve to control the opening into a pipe 44 which leads to a drum 45, and from the casing 38 a train line pipe 47 leads.

From the port 21 in the brake valve seat a pipe 48 leads to the upper part of the casing 49 of a quick release valve which is divided horizontally by a partition 50, the portion of said valve casing below the partition being in communication by means of a pipe 51 with the brake cylinder pipe 30. In the upper part of the quick release valve casing is a piston 52 the stem 53 of which passes through the partition 50 and a suitable stuffing box 54 and carries a valve 55 positioned in the lower chamber of the casing. This valve controls an exhaust port 56 in the valve casing intended for the exhaust from the engine and tender brake cylinder. The valve 55 preferably has an apertured disk 57, a beveled seating face 58 and wings 59 below the face which work in the exhaust port 56.

With the parts constructed as described the equalizing valve chamber receives air from the main reservoir or drum from the top of the rotary valve through port 4, and thence through cavity 6 in the valve seat and cavities 17 and 18 in the rotary valve and from thence through port 20 and pipe 23, while main drum pressure beneath the piston is received through pipe 24 from the main drum nozzle or pipe 25. The quick release valve between its piston and partition communicates with the main drum pressure through pipe 48, port 21 in valve seat and cavities 17 and 18, in the valve from the cavity 6 in the seat only when straight air brakes are to be released; and the quick release valve below its partition is connected through pipe 51, with the brake-cylinder pressure in the straight air brake cylinder pipe only when the straight air brakes are to be applied, said brake cylinder pressure being the pressure to which the main drum pressure has been reduced by the reducing valve 31.

The automatic valve above its diaphragm communicates with the train line pipe 47, and below the diaphragm is in communication through pipe 32 with the main drum pressure or air through the equalizing valve above its piston, pipe 23 and port 20 in the valve seat, when in running position, and when in straight air release position through the equalizing valve, pipe 23 and the cavity 19 in the rotary valve. The spring on top of the diaphragm is set at the pressure desired and so it will apply the straight air brakes automatically. When the train line pressure is reduced below normal or the pressure at which the automatic valve spring is set, the main drum pressure on the underside of the diaphragm will lift the valve from its seat and allow the air which is on top of the equalizing valve to flow into the automatic drum faster than port 20 in the rotary valve seat can supply it, thus permitting the piston in the equalizing valve to be raised by the pressure beneath it so as to lift the valve 28 from its seat, and permit straight air to go to brake cylinder and apply the brakes on the engine and tender. This also enables the engineer to release either the train or the engine brakes without interfering with the other, thus giving him independent control of both. This is made possible by the presence of the automatic drum. When the pressure in this drum becomes equalized with that of the main drum, the piston in the equalizing valve seats its valve and shuts off air to the brake cylinder.

In applying the brakes on the engine and tender by straight air, the engineer's brake-valve handle is moved to straight air application or holding position. This causes exhaust cavity 15 in rotary valve to register with port 20 in the valve seat, and allows the air on top of the equalizing valve piston to escape to atmosphere through the exhaust cavity 13 in the rotary valve and cavity 12 in the valve seat, thus permitting the piston to be raised and allowing air to rush through pipe 30 to the reducing valve 31 wherein it is reduced to the pressure at which braking is being effected and from whence it passes to the brake cylinder, and also into the bottom chamber of the quick release valve closing the valve therein, and thus applying the brakes on the engine and tender by straight air.

If the brakes are to be applied automatically, the brake-valve handle is moved to service stop position which brings exhaust cavity 15 of the rotary valve into register with the preliminary port 10 in the valve seat which permits the air to exhaust from off the equalizing piston in the brake-valve.

If the brakes are to be applied in emergency, the brake-valve handle is moved to emergency position, whereupon the wide end of exhaust cavity 13 in the rotary valve uncovers port 20 in the valve seat and the air on top of the piston in the equalizing valve escapes to atmosphere through the exhaust cavities 13 and 12 and exhaust port 11 thus permitting the equalizing valve piston to be raised by the pressure beneath it and air to go to the engine and tender brake-cylinders. This also brings in the well known emergency features of the automatic action in the Westinghouse engineer's brake valve. Accordingly there is a straight-air application of brakes on the engine and tender, and an automatic application of the train brakes, the first application being to the engine and then to the train brakes.

In releasing the brakes, if the engine or straight air brakes are to be released, the brake-valve handle is moved to "straight air release" position, which brings feed cavities 17 and 18 of the rotary valve into communication with port 21 of the valve seat whereupon main drum pressure is conveyed through pipe 48 to the quick release valve 49 and passing under piston head 52 raises the piston and lifts the valve 55 so that the exhaust port 56 is opened and air in the engine and tender brake cylinder permitted to escape through the brake cylinder pipe and the lower chamber of the quick release valve, thus releasing the engine brakes. At the same time the cavity 19 in the rotary valve face connects with port 20 in the valve seat and feeds the equalizing valve above the piston and holds its valve on its seat, thus cutting off main drum pressure in this straight air release position of the parts.

To release the train or automatic brakes, the brake valve handle is moved to full release or running position thus bringing into action the well known Westinghouse feature and releasing the brakes. At this time the feed cavities 17 and 18 of the rotary valve communicate with port 20 in the valve seat and main reservoir pressure is fed to the top of the piston in the equalizing valve chamber, thus preventing the passage of air to the engine and tender brake cylinders.

Under the construction described, to release brakes on engine and tender and hold them on train, move the brake-valve handle quickly to straight air release position; to release on train and hold on engine and tender, move the brake-valve handle to running position, or full release.

It is also to be noted that under the invention, the brakes on the engine and tender can be applied and also be released independently of the train or automatic brakes; that the brakes on the engine and on the train can be applied together, or one independently of the other; that independent control of the engine and the train brakes is obtained; that there can be a gradual application and also release of straight air on the engine brakes; that the brakes can be applied on engine and train, and the brakes on engine released while holding them on train, or they can be released on the train and held on engine and the train line recharged with air; that the engine and tender brakes can be applied first, and then the automatic be applied, or the automatic can be applied first and then the engine and tender brakes applied, by moving the brake-valve handle to the proper position; or if desired both the engine and train brakes can be applied at the same time by moving the brake-valve handle to "emergency" position; and that the same braking power can be had in the engine and tender cylinders at all times regardless of piston travel and other conditions. The foregoing requires no more than one brake-valve handle which when moved to the proper positions makes it possible to obtain the different operations specified.

While I have taken the well known Westinghouse engineer's brake valve as illustrative of the application of my invention yet I am not confined thereto where it can be applied to other types; and while I have illustrated the preferred construction and arrangement of the various parts embodying the invention yet it is to be understood that I am not confined thereto so far as concerns the main or essential features of the invention.

Having described my invention and set forth its merits, what I claim is:—

1. In an engineer's brake valve formed with ports and passages for the application and release of air to and from the train line, of a valve for controlling the flow of main reservoir pressure to an engine brake cylinder, said valve having communication on one side with the main reservoir pressure and on the other side with said reservoir through a port in the brake-valve, said valve being controllable from the engineer's brake-valve to reduce the main reservoir pressure on one side to permit full main reservoir pressure to pass from the other side for straight air application of the engine-brakes, substantially as described.

2. In an engineer's brake valve formed with ports and passages for the application and release of air to and from the train line, of a valve controllable from the engineer's valve for straight air application of the engine brakes, and a second valve controllable from the engineer's valve for the application of main reservoir pressure to release the engine brakes, substantially as described.

3. In an engineer's brake valve, formed with ports and passages for the application and release of air to and from the train line, of a valve controllable from the engineer's valve for straight air application of the engine brakes, the ports and passages for the train line air and those for straight air application of the engine brakes being so arranged in relation to each other, that in emergency position the straight air is applied to the engine brakes and the train line air is exhausted, substantially as described.

4. In an engineer's brake valve formed with ports and passages for the application and release of air to and from the train line, of a quick release valve connected with a brake-cylinder pipe and with the brake-valve, said brake-valve having a port for the passage of main reservoir pressure to the release valve for release of the brakes, substantially as described.

5. In combination with an engineer's brake valve, an equalizing valve connected with a brake-cylinder pipe and in communication on one side of the valve with main reservoir pressure and on the other side with the engineer's brake-valve, said brake-valve being formed with ports and passages for feeding main reservoir pressure to one side of the equalizing valve to seat the valve and cut-off straight air from the brake-cylinder in release position, and for the exhaust of air from the same face of the valve to permit main reservoir pressure on the other side to unseat the valve and pass to the brake cylinder in straight air application of the brakes substantially as described.

6. In combination with an engineer's brake-valve formed with ports and passages for the application and release of air to and from the train line, of an equalizing valve connected with the brake-valve, with main reservoir pressure and with straight air brake cylinder, and an automatic pressure controlled valve connected with the train line, with the equalizing valve chamber, and with an automatic drum, substantially as and for the purposes described.

7. In combination with an engineer's brake-valve formed with ports and passages for the application and release of air to and from the train line, of an equalizing valve having communication on one face with main reservoir pressure through the brake-valve and on the other face in communication with main reservoir pressure and with straight air brake cylinder, and a quick release valve connected with the straight air brake cylinder, and with the brake-valve to receive main reservoir pressure through the same for releasing air from the straight air brake cylinder in straight air release of the brakes, substantially as described.

8. In an engineer's brake-valve the combination with a seat formed with a port for supplying main reservoir pressure to an equalizing valve and a port for supplying main reservoir pressure to a release valve, of a rotatable valve having passages to register with each of said ports in the valve-seat respectively, for feeding main reservoir pressure thereto, substantially as described.

9. In an engineer's brake valve the combination with the valve seat formed with a port to communicate with an equalizing valve controlling straight air application to an engine brake cylinder and having an exhaust cavity leading to atmosphere, of a rotatable valve having a passage to communicate with the said port in the seat and an exhaust cavity to connect it with the exhaust cavity in the seat for exhaust of air from the equalizing valve in straight air application of the brakes, substantially as described.

10. In an engineer's valve the combination with a valve seat having a port to communicate with an equalizing valve controlling straight air application of the engine brakes, said equalizing valve having main reservoir pressure on both sides, an exhaust cavity and exhaust port leading to atmosphere, and a port to communicate with the train line, of a rotatable valve formed with an exhaust cavity to communicate with the port in the valve-seat, which communicates with said equalizing valve for reducing main reservoir pressure on that side of the valve to permit full main reservoir pressure to pass from the other side of the valve, and means to establish communication between the train line and an exhaust port for automatic application of the train brakes, thus permitting straight air application of the brakes to the engine and automatic application of the train line brakes, substantially as described.

11. In an engineer's brake valve the combination with the valve seat formed with a port communicating with an equalizing valve controlling straight air application of the engine brakes, and a port to communicate with a quick release valve, of a rotatable valve having a passage to feed main reservoir pressure to the port in the seat leading to the quick release valve, and a passage to feed main reservoir pressure to the port leading to the equalizing valve, thus permitting quick release of the straight air brakes, substantially as described.

In testimony whereof I affix my signature in presence of two witnesses.

JOSEPH P. GAULT.

Witnesses:
J. B. WEAVER,
H. J. O'CONNOR.